United States Patent
Ikeda et al.

(10) Patent No.: US 6,279,439 B1
(45) Date of Patent: Aug. 28, 2001

(54) METHOD FOR MANUFACTURING A ONE-WAY CLUTCH CAGE

(75) Inventors: Takaaki Ikeda, Nara; Tetsuaki Numata, Kitakatsuragi-gun; Michiyuki Kamiji; Hiroyuki Maeda, both of Osaka, all of (JP)

(73) Assignees: Koyo Seiko Co., Ltd.; Nakanishi Metal Works Co., Ltd., both of Osaka (JP)

(*) Notice: Subject to any disclaimer, the term of this patent is extended or adjusted under 35 U.S.C. 154(b) by 0 days.

(21) Appl. No.: 09/318,837

(22) Filed: May 26, 1999

(30) Foreign Application Priority Data

May 27, 1998 (JP) .................................................. 10-145596

(51) Int. Cl.$^7$ .................................. B26F 1/12; B26D 9/00
(52) U.S. Cl. ..................................................... 83/39; 83/54
(58) Field of Search .............................. 72/294, 324, 464, 72/327, 333, 334, 335; 83/39, 40, 54, 181, 182, 184, 191; 29/898.054, 898.056, 898.057, 898.065, 898.067

(56) References Cited

U.S. PATENT DOCUMENTS

| | | | |
|---|---|---|---|
| 1,910,285 | * 5/1933 | Fiegel et al. | 83/184 |
| 3,005,369 | * 10/1961 | Koster | 83/40 |
| 3,107,566 | * 10/1963 | Archer | 83/40 X |
| 3,279,235 | * 10/1966 | Olson | 72/324 |
| 3,878,705 | * 4/1975 | Iffland | 72/324 X |
| 4,970,925 | * 11/1990 | Nakatsuji | 83/54 X |
| 4,998,430 | * 3/1991 | Howe | 83/40 X |
| 5,078,243 | * 1/1992 | Kanai et al. | . |
| 5,553,525 | * 9/1996 | Mailey et al. | 83/184 |
| 5,709,139 | * 1/1998 | Shimizu et al. | 83/54 |

FOREIGN PATENT DOCUMENTS

| | | |
|---|---|---|
| 2231627 | * 11/1990 | (GB) . |
| 11336798 | * 12/1999 | (JP) . |

* cited by examiner

Primary Examiner—Charles Goodman
(74) Attorney, Agent, or Firm—Wenderoth, Lind & Ponack, L.L.P.

(57) ABSTRACT

A method for manufacturing a one-way clutch cage allows slits of the cage to be formed with a short punching distance, wherein the slits are narrow in width and the cage is less prone to deformation. In this method for manufacturing a one-way clutch cage, after slits 8, 10, 11, 12 have been formed, windows 17 are formed and then an outer annular part 18 is cut. Therefore, since the slits can be formed in a cylindrical member 2 that has not yet been subjected to the window formation process of the outer annular part cut-out process, and that is sufficiently strong, a radially diagonal punching operation can be performed to form the slits. During this radially diagonal punching operation, a boundary portion between a cylindrical portion 3 and an outer flange 5 is punched out from an inside of the cylindrical member toward an outside of the cylindrical member. Thus, the punching distance can be shortened, the punching die can be thinned in thickness and the slit width can be reduced, as compared with horizontal punching.

18 Claims, 4 Drawing Sheets

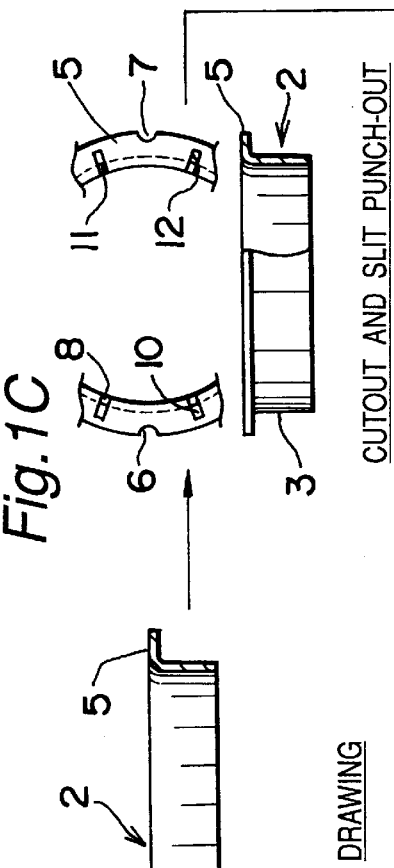
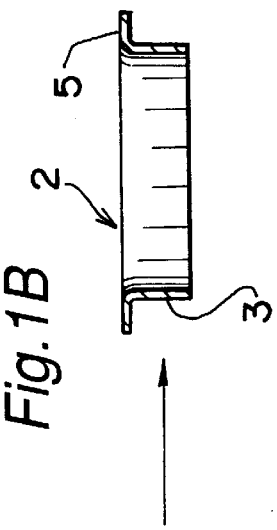
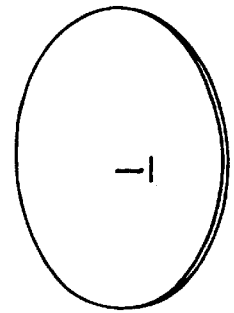
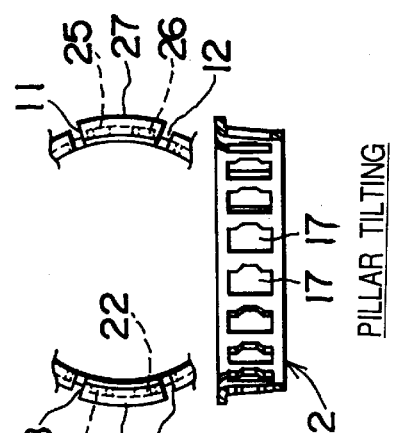
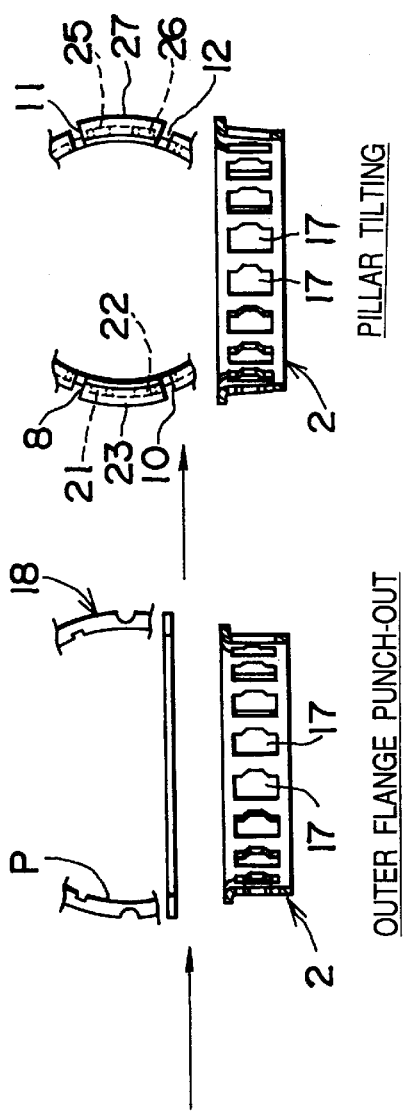
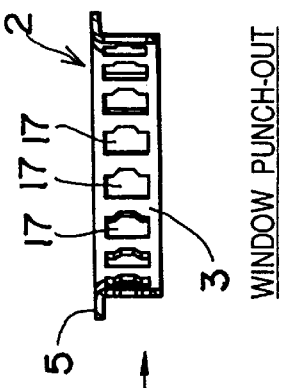

RADIAL PUNCH-OUT

PARALLEL PUNCH-OUT

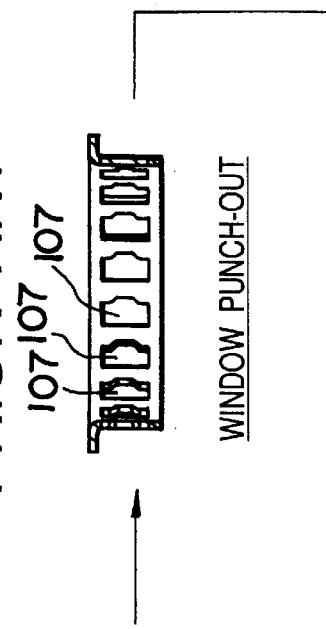
Fig.4A PRIOR ART — PUNCH-OUT
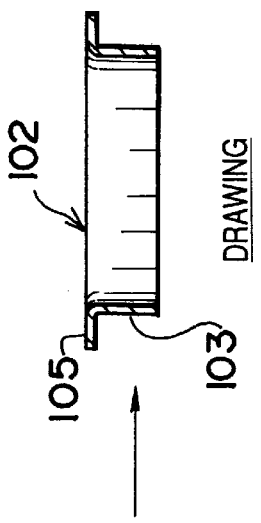
Fig.4B PRIOR ART — DRAWING
Fig.4C PRIOR ART — WINDOW PUNCH-OUT
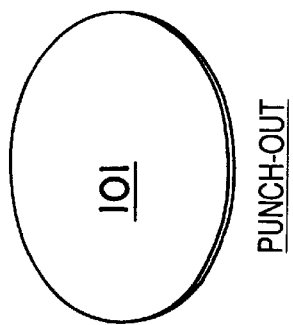
Fig.4D PRIOR ART — OUTER FLANGE PUNCH-OUT
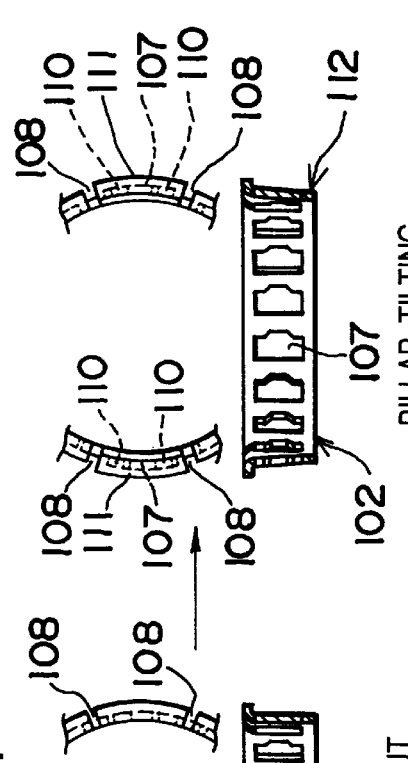
Fig.4E PRIOR ART — SLIT PUNCH-OUT
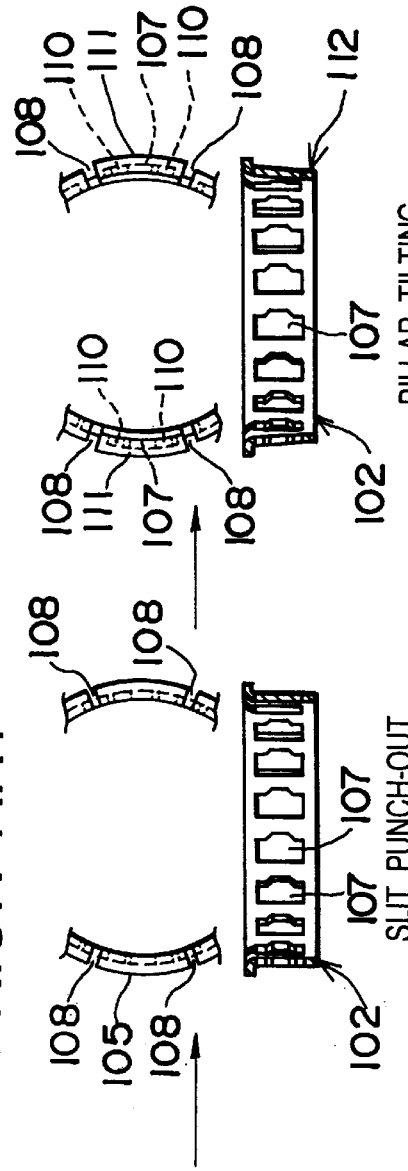
Fig.4F PRIOR ART — PILLAR TILTING
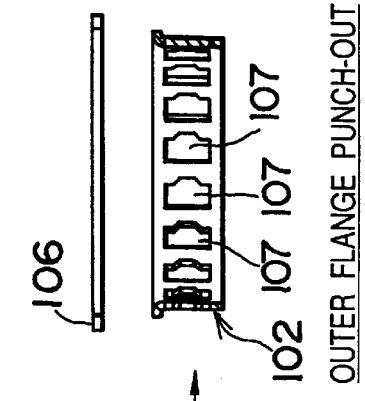

METHOD FOR MANUFACTURING A ONE-WAY CLUTCH CAGE

BACKGROUND OF THE INVENTION

The present invention relates to a method for manufacturing a one-way clutch cage to be used in, for example, transmissions of automobiles or the like.

Conventionally, there has been a method for manufacturing a one-way clutch cage as shown in FIGS. 4AnF and 5A to 5C. In this manufacturing method, first, as shown in FIG. 4A, a disc 101 is punched out from a metal plate. Next, as shown in FIG. 4B, central part of the disc 101 is drawn by drawing process and a bottom thereof is punched out, by which a circular-cylindrical member 102 is formed. This cylindrical member 102 is composed of a cylindrical portion 103 and an outer flange 105 located at an axial end of the cylindrical portion 103.

Next, as shown in FIG. 4C, a plurality of windows 107, 107, . . . are punched out in the cylindrical portion 103 of the cylindrical member 102 so as to be circumferentially spaced from one another with specified intervals. Subsequently, as shown in FIG. 4D, an outer annular part 106 ranging from the radially outermost circumference of outer flange 105 to a radially inward location, defined by a specified length from the radially innermost circumference of the outer flange 105, towards the radially outermost circumference of the outer flange 105 is punched out of the outer flange 105 of the cylindrical member 102.

Next, as shown in FIGS. 4E and 5C, four circumferential places of the cylindrical member 102 are punched from an inside of the cylindrical member to the outside thereof, so that slits 108 are formed which range across the outer flange 105 to the windows 107. One window 107 is sandwiched by one pair of adjacent slits 108, 108, while another window 107 opposite to the one window 107 is sandwiched by the other pair of adjacent slits 108, 108.

Next, as shown in FIG. 4F, pillars 110, 110 beside the windows 107 sandwiched by the aforementioned pairs of slits 108, 108 are tilted radially outward so that a rim portion 111 sandwiched by the pairs of slits 108, 108 respectively, protrudes radially outward. These rim portions 111, when the one-way clutch is assembled to an outer ring (not shown), press the inner circumferential surface of the outer ring so that a cage 112 is frictionally coupled to the outer ring.

The above-described method for manufacturing a one-way clutch cage, unfortunately, has the following problems (1), (2) and (3):

(1) In the slit punch-out process of FIG. 4E, because a punch 200 is thrust out from the radial inside to the radial outside of the cylindrical member 102 to form the slits 108 as shown in FIGS. 5B and 5C, the total punching distance includes a disc thickness t plus a radial distance D of the outer flange 105 resulting after the cutout of the outer annular part 106. Such a long punching distance causes a need for increasing the punching width in terms of the punching die life, which in turn makes the slit width wider so that another cage is more likely to be caught in this slit 108, resulting in a disadvantage of difficulty in handling. Also, a wide slit width results in a lower strength, whereby the cage 112 becomes prone to deformation. This is a further disadvantage;

(2) As shown in FIG. 5A, during the slit punch-out process, there is a tendency toward the occurrence of burrs in the windows 107. This illustrates another disadvantage; and (3) In the slit punch-out process, because of a large slit width as described in (1) above, the windows 107 are prone to deformation so that when the cage is assembled to a one-way clutch, the sprag deteriorates in operation and the one-way clutch deteriorates in performance as a disadvantage.

SUMMARY OF THE INVENTION

Therefore, an object of the present invention is to provide a method for manufacturing a one-way clutch cage, which method allows cage slits to be punched out with a short punching distance, and in which method the slits are narrow in width and less prone to deformation.

Another object of the present invention is to provide a method for manufacturing a one-way clutch cage, in which method the slit punch-out process does not result in burrs at the windows.

In order to achieve the above objects, there is provided a method for manufacturing a one-way clutch-cage, comprising:

a slit forming step for forming slits in a cylindrical member having a cylindrical portion and an outer flange at an axial end of the cylindrical portion, so that the slits extend radially inward from a location which is radially inward from an outer edge of the outer flange by a specified distance, and also extend axially from the axial end of the cylindrical portion a specified distance; and an outer flange cutting step for, after the slit forming step, cutting an outer annular part out of the outer flange so that the outer annular part extends from a location which is radially inner the radially outermost end of the slits by a specified distance, to a radially outermost circumference of the outer flange.

In this invention, slits are punched out before the step of cutting the outer flange. Therefore, the slits can be formed by punching out a boundary portion between the cylindrical portion and the outer flange (i.e., a portion between the later-cut outer annular part and the windows) in a radially diagonal or slanted direction from the inside of the cylindrical member toward the outside of the cylindrical member. Formation of the slits by such a radially diagonal or slanted punching operation after the cutting of the outer annular part of the outer flange as in the prior art, is impermissible because of a lack of strength of the cylindrical member that would lead to deformation thereof.

In this invention, since the diagonal punch-out is enabled, the punching distance can be shortened as compared with such horizontal punching as the prior art. This allows the punching die to be thinned in thickness and the slit width to be lessened, making it unlikely that other cages become caught in the slits, resulting in an improved handleability. Besides, by virtue of the narrowed slit width, the strength of the cage can be improved upon, and deformation of the cage can be prevented so that the one-way clutch can exhibit improved in performance.

One embodiment further comprises a window punch-out step for, after the slit forming step and before the outer flange cutting step, punching out in the cylindrical portion a plurality of windows including windows that are continuous to the slits, so that the windows are circumferentially spaced from one another with specified intervals.

In this embodiment, since the windows are formed after the formation of the slits, no burrs occur at the windows.

In one embodiment, when the slits are formed during the slit forming step, at least one cutout for chucking positioning is formed in the outer flange of the cylindrical member.

In this embodiment, in the slit forming step, at least one cutout for chucking positioning is formed. This at least one chucking positioning cutout can be used in later steps of a window punch-out process and an outer-ring cutting step. Therefore, the number of times of positioning can be reduced so that a reduction in manufacturing time as well as a simplification of processes can be achieved.

BRIEF DESCRIPTION OF THE DRAWINGS

The present invention will become more fully understood from the detailed description given hereinbelow and the accompanying drawings which are given by way of illustration only, and thus are not limiting of the present invention, and wherein:

FIGS. 1A, 1B, 1C, 1D, 1E and 1F are process diagrams for explaining an embodiment of a method for manufacturing a one-way clutch cage according to the present invention;

FIGS. 4A, 4B, 4C, 4D, 4E and 4F are process diagrams for explaining a method for manufacturing a one-way clutch cage according to the prior art.

DETAILED DESCRIPTION OF THE PREFERRED EMBODIMENTS

Figure 2A:
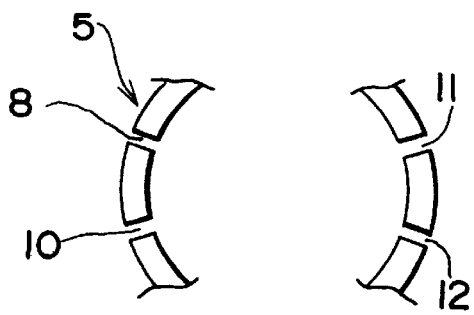
FIG. 2A is a view showing a state in which slits have been punched out radially in the embodiment.

Hereinbelow, the present invention is described in detail by an embodiment thereof illustrated in the accompanying drawings.

Referring to FIGS. 1A, 1B, 1C, 1D, 1E and 1F in order, an embodiment of the method for manufacturing a one-way clutch cage according to the present invention is explained.

First, as shown in FIG. 1A, a disc 1 is punched from a specified metal plate. Next, as shown in FIG. 1B, a central part of the disc 1 is drawn by drawing process and a bottom thereof is punched out, by which a circular-cylindrical member 2 is formed. This cylindrical member 2 is composed of a cylindrical portion 3 and a outer flange 5 located at an axial end of the cylindrical portion 3.

Next, as shown in FIG. 1C, in the outer flange 5 of the cylindrical member 2, two generally semicircular cutouts 6, 7 are formed, and four slits 8, 10, 11, 12 are formed. The cutouts 6 and 7 are cutouts which are used for chucking positioning, and are circumferentially shifted from each other by approximately 180° along the outer flange 5.

Figure 3A:
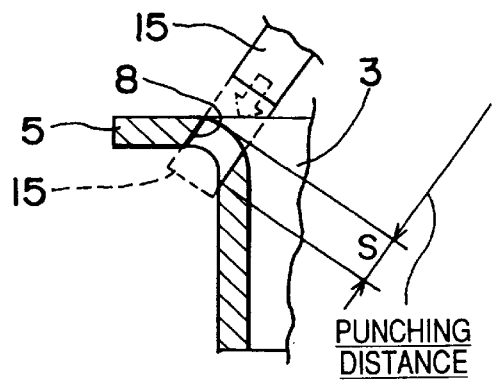
FIG. 3A is a schematic view showing the direction and range for slit punch-out in the embodiment.
Figure 3B:
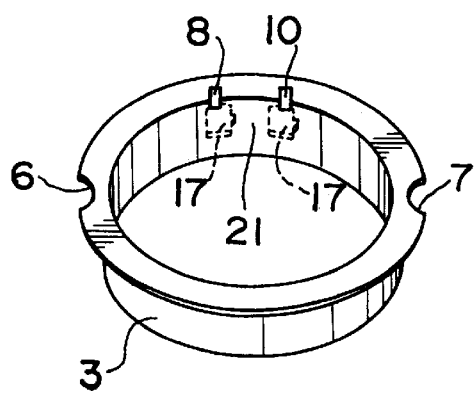
FIG. 3B is a perspective view of a cylindrical member in which a pair of slits and a pair of chucking cutouts have been formed.
Figure 5A:
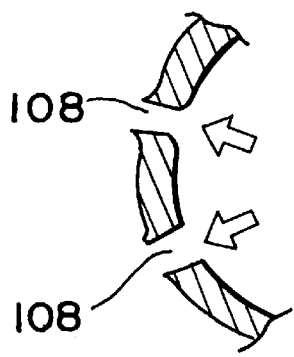
FIG. 5A is a schematic view showing a state, as viewed axially, in which slits are punched out with a punch in the prior art example.
Figure 5B:
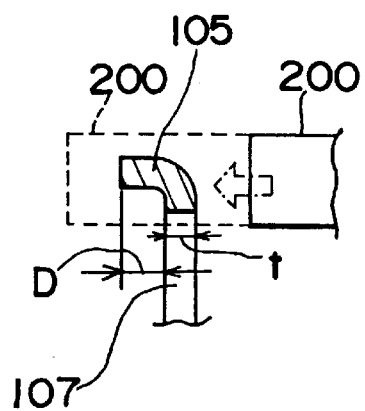
FIG. 5B is a sectional schematic view showing a state of the punching, as viewed circumferentially.
Figure 5C:
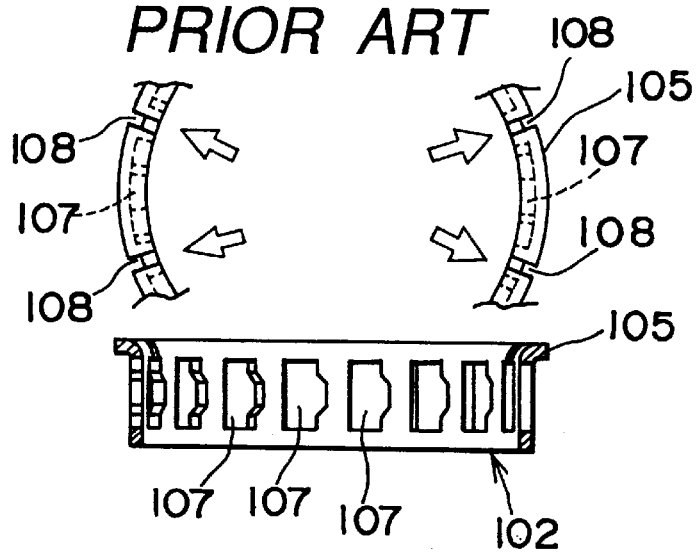
FIG. 5C is a view including a view partly showing a cylindrical member in which the slits have been punched out, as viewed axially, and a view showing a state of the cylindrical member as viewed sideways.

FIG. 3A shows a state in which the slit 8, of the four slits 8, 10, 11, 12 is formed with a punch 15. This punch 15 forms the slit 8 by punching the cylindrical member 2 in a radially diagonal or slanted direction from inside of the cylindrical member 2 toward an outside of the cylindrical member 2. This slit 8 is formed so as to extend from a window 17, which will be formed in a later process, to an outer annular part 18, which will be cut out in a later process. Such a diagonal or slanted punch-out process allows the punching distance S (see FIG. 3A) to be reduced as compared with the conventional horizontal punch-out process as shown in FIG. 5B. Accordingly, the punching die can be thinned in thickness so that the slit 8 can be reduced in width, thus making it unlikely that another cage will become caught in the slit 8, and thereby resulting in an improved handleability. Also, by the slit 8 being thinned in width, the strength of the cage can be improved, and the cage can be prevented from deformation so that the behavior of sprags to be fitted to the cage can be stabilized and the performance of the one-way clutch can be improved. In addition, the manner of forming the slit 8 is the same with regard to the slits 10, 11 and 12.

Next, as shown in FIG. 1D, the outer flange 5 is positioned and chucked by making use of the cutouts 6 and 7, and then a window punch-out process is performed. In this window punch-out process, a plurality of windows 17 are formed in the cylindrical portion 3 of the cylindrical member 2 so as to be spaced circumferentially from one another with specified intervals. Into these windows 17, the sprags of the one-way clutch are to be fitted, respectively.

Since the window punch-out process is done after the formation of the slit 8 as shown above, there occurs no burrs at the windows 17 resulting from the slit punch-out process. Therefore, the sprags (not shown) can be smoothly held in the windows 17.

Figure 3C:
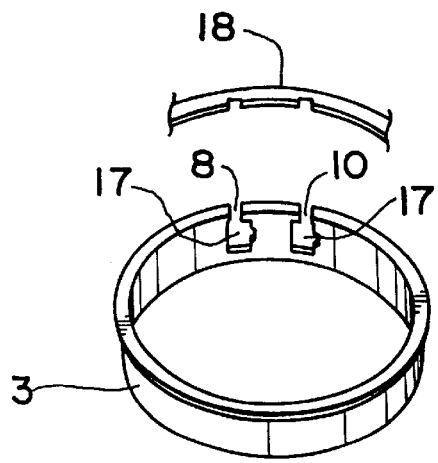
FIG. 3C is a schematic view partly showing a state in which an outer ring of an outer flange is cut out.

Next, the outer annular part 18 of the outer flange 5 is punched out as shown in FIGS. 1E and 3C. This outer annular part 18 ranges from the radially outermost circumference of the outer flange 5 to be a location P that is radially inner the radially outermost end of the slits 8, 10, 11, 12 by a specified extent. By the punch-out of this outer annular part 18, the windows 17 communicating with the slits 8, 10 and 11, 12 are opened to the outside of the outer flange 5.

In this embodiment, since the cutouts 6, 7 for chucking positioning formed in the slit punch-out process can be utilized in the window punch-out process and the outer annular part punch-out process, the number of times the cylindrical member 2 is positioned can be reduced so that a reduction in manufacturing time, as well as asimplification of the punch out processes, can be achieved.

Next, as shown in FIG. 1F, pillars 21, 22 beside the window 17 located between the slits 8 and 10 are tilted radially outward so that a rim portion 23 sandwiched by the pair of slits 8 and 10 protrudes radially outward. Also, pillars 25, 26 beside another window 17 located between the slits 11 and 12 are tilted radially outward so that a rim portion 27 sandwiched by the pair of slits 11 and 12 protrudes radially outward. The rim portions 23, 27, when the one-way clutch is assembled to an outer ring, presses the inner circumferential surface of the outer ring so that the cage is frictionally coupled to the outer ring.

Figure 2B:
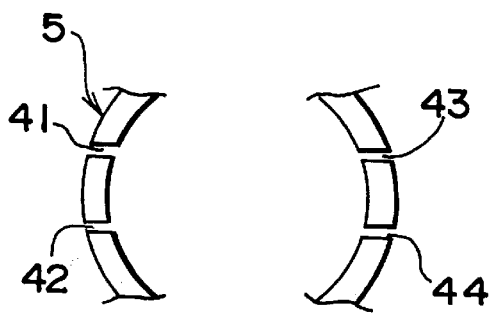
FIG. 2B is a view showing a state in which slits have been punched out in parallel.

In this embodiment, the slits 8, 10, 11, 12 have been formed radially as shown in FIG. 2A. However, it is also possible to form slits 41, 42 and 43, 44 parallel to each other as shown in FIG. 2B.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for manufacturing a one-way clutch cage, comprising:

in a cylindrical member comprised of a cylindrical portion and an outer flange at an end of the cylindrical portion, forming slits by punching through portions located between said cylindrical portion and said outer flange, wherein the punching occurs in a direction that is slanted relative to a longitudinal axis of said cylindrical member from an inner side of said cylindrical member to an outer side of said cylindrical member; and then cutting an outer annular part from said outer flange, wherein said outer annular part extends from an outer circumference of said outer flange to a position that is radially inner an outermost end of said slits.

2. The method according to claim 1, and further comprising after the punching and before the cutting, forming windows in said cylindrical portion that are continuous with said slits by punching through portions of said cylindrical portion, wherein said windows are circumferentially spaced from one another.

3. The method according to claim 2, and further comprising simultaneously with the formation of said slits, forming at least one notch in said outer flange.

4. The method according to claim 3, and further comprising using said at least one notch to position said cylindrical member during the cutting of said annular part from said outer flange and during the formation of said windows.

5. The method according to claim 1, and further comprising simultaneously with the formation of said slits, forming at least one notch in said outer flange.

6. The method according to claim 5, and further comprising using said at least one notch to position said cylindrical member during the cutting of said annular part from said outer flange.

7. A method for manufacturing a one-way clutch cage, comprising:

in a cylindrical member comprised of a cylindrical portion and an outer flange at an end of the cylindrical portion, forming slits by removing portions located between said cylindrical portion and said outer flange, wherein the removal occurs in a direction that is slanted relative to a longitudinal axis of said cylindrical member.

8. The method according to claim 7, and further comprising removing an outer annular part from said outer flange.

9. The method according to claim 8, and further comprising after the formation of said slits, forming windows in said cylindrical portion that are continuous with said slits.

10. The method according to claim 9, and further comprising simultaneously with the formation of said slits, forming at least one notch in said outer flange.

11. The method according to claim 10, and further comprising using said at least one notch to position said cylindrical member during the removal of said annular part from said outer flange and during the formation of said windows.

12. The method according to claim 8, wherein the removal of said outer annular part occurs subsequent to the formation of said slits, and includes cutting said outer annular part from said outer flange such that said outer annular part extends from an outer circumference of said outer flange to a position that is radially inner an outermost end of said slits.

13. The method according to claim 8, and further comprising simultaneously with the formation of said slits, forming at least one notch in said outer flange.

14. The method according to claim 13, and further comprising using said at least one notch to position said cylindrical member during the removal of said annular part from said outer flange.

15. The method according to claim 7, and further comprising after the formation of said slits, forming windows in said cylindrical portion that are continuous with said slits.

16. The method according to claim 15, wherein the formation of said windows includes punching through portions of said cylindrical portion such that said windows are circumferentially spaced from one another.

17. The method according to claim 7, wherein the removal of the portions includes punching through said cylindrical member at a location between said cylindrical member and said outer flange.

18. The method according to claim 7, wherein the removal of the portions includes removing the portions in the slanted direction from an inner side of said cylindrical member to an outer side of said cylindrical member.

\* \* \* \* \*